United States Patent [19]

Langdon

[11] Patent Number: 4,519,950

[45] Date of Patent: May 28, 1985

[54] ACETAL GROUP-CONTAINING NON-IONIC SURFACTANTS

[75] Inventor: William K. Langdon, Grosse Ile, Mich.

[73] Assignee: BASF Wyandotte Corporation, Wyandotte, Mich.

[21] Appl. No.: 225,570

[22] Filed: Jan. 16, 1981

[51] Int. Cl.³ ............................................... C09F 1/00
[52] U.S. Cl. ................................. 260/404; 260/404.5
[58] Field of Search ..................... 260/404.5 EO, 404

[56] References Cited

U.S. PATENT DOCUMENTS

| | | | |
|---|---|---|---|
| 2,630,440 | 3/1953 | Gunderson | 568/601 |
| 3,875,197 | 4/1975 | Lorenz | 260/404.5 EO |
| 4,072,704 | 2/1978 | Langdon | 260/463 |
| 4,189,609 | 2/1980 | Langdon | 568/601 |

Primary Examiner—John F. Niebling
Attorney, Agent, or Firm—Bernhard R. Swick

[57] ABSTRACT

Acetal-coupled non-ionic surfactants are easily degraded into relatively environmentally innocuous fragments having little or no surface activity. The fragments are sufficiently low in molecular weight to be oxidized when exposed to water and atmospheric oxygen. Surface activity can also be destroyed by lowering the alkalinity of the medium in which the non-ionic surfactant is utilized to below pH 7.

7 Claims, No Drawings

ACETAL GROUP-CONTAINING NON-IONIC SURFACTANTS

BACKGROUND OF THE INVENTION

1. Field of the Invention

This invention relates to biodegradable non-ionic surfactants.

2. Description of the Prior Art

A wide variety of non-ionic surface-active agents are known in the art. Because of their non-ionic nature, these surface-active agents are usually stable in acid, basic and neutral media. Recently, biodegradable polyoxyalkylene copolymer surfactants have been disclosed in U.S. Pat. Nos. 3,931,337 and 4,189,609. These are prepared from individual blocks of polymers and copolymers of alkylene oxides by reaction with formaldehyde or a dialkyl carbonate. The surfactant molecules fragment into individual polyoxyalkylene glycols under the influence of biologic agents or by hydrolysis or when exposed to slightly acidic or basic conditions. Surface-active acetals and formals are disclosed in U.S. Pat. No. 2,905,719. These are ethylene oxide derivatives coupled to the residue of an alkyl alcohol having 8 to 18 carbon atoms utilizing formaldehyde or acetaldehyde. Acid-sensitive non-ionic surface-active compositions are thereby produced which are stable in basic or neutral media. Surface-activity is lost upon treating these non-ionic acetals with an acid.

In U.S. Pat. No. 2,796,401, complex formal lubricating compositions are disclosed which are the reaction product of monohydric aliphatic or aromatic alcohol, or a glycol with formaldehyde as a coupling agent. The product is made in two stages in which, in the first stage, the hemiformal of the alcohol is made by heating equal moles of the alcohol and formaldehyde. Subsequently, in the second stage, the desired molar proportion of glycol and formaldehyde is added to the hemiformal and reacted to make the desired product.

In U.S. Pat. No. 2,786,081, acetal condensation products are disclosed which are the reaction products of diethylene glycol and formaldehyde. These are useful as plasticizers for polymers including film-forming materials.

SUMMARY OF THE INVENTION

Biodegradable and acid degradable non-ionic surface-active compositions are disclosed containing the residue of a secondary carboxamide, hereafter referred to as a monofunctional amide or a sulfonamide compound coupled to a hydrophilic polyoxyalkylene glycol derived from at least one alkylene oxide having 2 to 4 carbon atoms. The compositions contain at least one terminal hydrophobic group derived from the monofunctional amides or sulfonamides. The aldehyde coupling agent can be any aliphatic aldehyde having up to 4 aliphatic carbon atoms such as formaldehyde, acetaldehyde, propionaldehyde, and butyraldehyde. Preferably the aldehyde is formaldehyde or acetaldehyde and most preferably the aldehyde is formaldehyde.

The acid sensitive nature of the compositions of the invention permits the biodegradation into relatively environmentally inoccuous fragments upon exposure of the surface-active agents of the invention to water and atmospheric oxygen. The surface-active agents of the invention can also be split into relatively non-surface-active fragments upon reducing the pH of the media below 7. Therefore, the surface-active agents of the invention are particularly useful where it is desired to form an emulsion and then coagulate the emulsion simply by lowing the pH below 7. Unexpectedly, the surface-active agents of the invention have unusually low viscosity. The surface-active agents of the invention are unexpectedly formed by a sequential coupling mechanism in which a monofunctional hydrophobic amide or sulfonamide is coupled with a hydrophilic polyoxyalkylene glycol, as indicated by the water-soluble product obtained. Sequential coupling rather than the expected random coupling of each of the reactants occurs since water-insoluble species are not formed.

DETAILED DESCRIPTION OF THE INVENTION

The surface-active agents of the invention have the formulas:

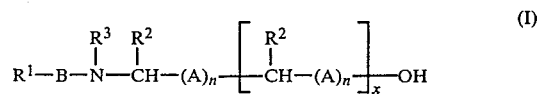

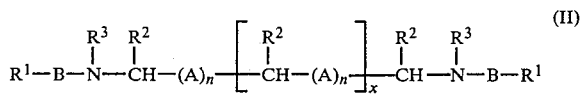

wherein $R^1$ is the residue of a hydrophobic monofunctional organic compound selected from the group consisting of at least one of an alkyl, alkylaryl, arylalkyl, and alkylarylalkyl group; wherein each alkyl group has about 6 to about 30 carbon atoms; B is $C=O$, $O=S=O$ or mixtures thereof; and wherein $R^2$ is hydrogen or alkyl of 1 to about 4 carbon atoms; $R^3$ is alkyl or hydroxyl substituted alkyl of 1 to about 4 carbon atoms; A is the residue of a hydrophilic oxyalkylene polymer derived from the same or different alkylene oxides wherein said polymer is selected from at least one of the group consisting of polyalkylene glycols derived respectively from the reaction of ethylene oxide or ethylene oxide and alkylene oxides having 3 to 4 carbon atoms with an active hydrogen compound having at least 2 active hydrogen atoms; x is an integer of 1 to 20, preferably 1 to 10, and n is individually selected from integers such that the molecular weight is about 104 to about 1000.

The hydrophilic polyoxyalkylenes utilized in the preparation of the surface-active agents of the invention are prepared in a conventional manner by reacting an alkylene oxide or mixture thereof with an initiator compound containing at least one active hydrogen atom. Preferably, the initiator compounds have molecular weights of less than 100. Like most surface-active agents, the surface-active agents of the invention are composed of hydrophilic and hydrophobic portions in the same molecule. As is well known in this art, ethylene oxide or mixtures thereof with other lower alkylene oxides can be employed to provide the hydrophilic portion of the molecule. The surface-active compounds of the invention preferably contain the residue of a monofunctional, aliphatic amide or sulfonamide; such as an alkyl amide or an alkyl sulfonamide having about 6 to about 30 carbon atoms in the alkyl group to provide the hydrophobic portion of the molecule.

The alkylene oxides which can be employed as reactants in the formation of the hydrophilic polyoxyalkylenes are the lower alkylene oxides having 2 to 4 carbon atoms. Examples of such alkylene oxides are ethylene oxide, propylene oxide, the various butylene oxides, and tetrahydrofuran. Mixtures of ethylene oxide with other lower alkylene oxides can be employed to obtain varying degrees of hydrophilicity. The hydrophilic polyoxyalkylene polymers utilized as reactants can have a molecular weight of about 104 to about 1000. Preferably, the molecular weight is about 200 to about 1000. The preferred use of relatively low molecular weight alkylene oxide polymers provides economies in the preparation of surface-active agents in that the reaction time to produce conventional surface-active agents based upon polyoxyalkylenes can be considerably reduced. The use of relatively low molecular weight polyoxyalkylene polymers, coupled in accordance with the process of the invention, also provides readily biodegradable surfactants. Upon degradation, not only do these split off low molecular weight polyoxyalkylene polymers exhibit relatively little surface-active effects but these polymers are, in turn, more readily oxidized than similar high molecular wight species when exposed to water and atmospheric oxygen. Thus, the surface-active agents of the invention can provide all the advantageous surface-active properties of high molecular weight polyoxyalkylene polymer prior art non-ionic surfactants. When such surfactants are fragmented such as by reducing the pH of the media in which the surfactant is present to below 7, the individual polyoxyalkylene polymer fragments readily oxidize and can be biodegraded.

The low molecular weight hydrophilic polyoxyalkylene copolymers employed in this invention are generally prepared by carrying out the condensation reaction of the alkylene oxides with an active hydrogen-containing initiator in the presence of an alkaline catalyst in a manner well known to those skilled in the art. Any of the types of catalysts commonly used for alkylene oxide condensation reactions may be employed. Catalysts which may be employed include sodium hydroxide, potassium hydroxide, sodium methylate, sodium ethylate, potassium acetate, sodium acetate, tributylamine and triethylamine. After the condensation reaction is completed, the catalyst may be removed from the reaction mixture by any known procedure such as neutralization, filtration or ion exchange. The condensation is preferably carried out at elevated temperatures and pressures.

The term "active hydrogen atom" is well known to those skilled in the art. It is sufficiently labile to react with ethylene, propylene or butylene oxide and it reacts with methyl magnesium iodide, liberating methane according to the classical Zerewitinoff reaction. The hydrogen atoms are members of a functional group such as a hydroxyl group, a phenol group, a carboxylic acid group, or an amide group. Hydrogen atoms may be activated by proximity to carbonyl groups such as acetoacetic ester. Examples of active hydrogen initiator compounds, which can be used include ethylene glycol, diethylene glycol, propylene glycol, dipropylene glycol, butylene glycol, amylene glycol, hexylene glycol, heptylene glycol and octylene glycol.

Together with the use as reactants of hydrophilic polyoxyalkylene polymers, the surface-active compositions of the invention employ monofunctional amides, monofunctional sulfonamides, or mixtures thereof as reactants so as to provide at least one terminal hydrophobic group on each molecule of the surface-active compounds of the invention. These can be aliphatic or aliphatic-aromatic such as alkyl, alkylaryl, arylalkyl, and alkylarylalkyl amides and sulfonamides. The preferred monofunctional amides and sulfonamides have aliphatic groups containing about 6 to about 30 carbon atoms, most preferably about 8 to about 20 aliphatic carbon atoms. The aliphatic groups can be substituted or unsubstituted.

Examples of useful secondary alkyl amides are n-ethyloleylolamide, N-(2-hydroxy)ethyl-lauramide, N-methylpalmitamide, N-butyl-stearamide, etc.

Useful secondary amides include arylalkyl amides having about 6 to about 30 carbon atoms in the alkyl chain such as 8-phenyl-N-ethyl-caprylamide. Useful alkylaryl amides include dodecyl-N(2-hydroxyethyl)-benzamide. Useful alkyl amides include N-dodecyl-N-butyl-acetamide. Useful monofunctional alkyl sulfonamides include N-dodecyl-N-butyl-sulfonamide. Useful alkylaryl sulfonamides include 4-dodecyl-phenyl-N-methyl-sulfonamide. Useful arylalkyl sulfonamides include 4-octyl-N-propyl-benzene sulfonamide. Useful alkylarylalkyl sulfonamides include 2-(4-dodecyl-phenyl)-N-methyl-sulfonamide.

Any of the monofunctional amides and sulfonamides set forth above can have substituents which do not contain active hydrogen such as halogen, for example, chlorine, bromine, and iodine, nitrate groups, or alkoxy radicals.

The aldehydes utilized to couple the hydrophilic polyoxyalkylene glycols and hydrophobic monofunctional amides or sulfonamides are aliphatic aldehydes generally having 1 to about 4 carbon atoms in the alkyl group. Preferably, the aldehydes contain an alkyl chain which most preferably has 1 to about 2 carbon atoms. Examples of useful aldehydes are formaldehyde, acetaldehyde, propionaldehyde, and butyraldehyde.

In the preparation of the surface-active compounds of the invention, at least one each of the hydrophilic and hydrophobic compound reactants are admitted to a reaction zone and coupled with an aldehyde in a single stage reaction at reflux temperature in the presence of an acid catalyst and a reaction solvent. Generally, the reaction is carried out at a temperature of about 25° C. to 150° C. Examples of useful acid catalysts for the coupling reaction are sulfuric acid, hydrochloric acid, hydrobromic acid, para-toluene sulfonic acid, phosphoric acid, trifluoroacetic acid, methane sulfonic acid, and trichloroacetic acid. Preferably sulfuric acid is utilized as the catalyst. The amount of acid catalyst employed can vary from about 0.01 percent by weight to about 3 percent by weight based upon the total weight of the reactants present. Usually, the reaction is carried out in the presence of an organic reaction solvent which is immiscible with water. The solvent is employed so as to allow removal of the water of reaction by azeotropic distillation. Examples of useful solvents are benzene, toluene, xylene, hexane, and cyclohexane. The time required for the completion of the coupling reaction is generally from about 15 minutes to 10 hours. Preferably, the reaction is completed within 5 hours.

The following examples will further illustrate the method of preparation of the non-ionic, surface-active agents containing acetal groups and their use as surface-active agents. These examples, however, are not to be considered as limiting the scope of the invention. In the specification, claims and examples which follow, all parts, percentages, and proportions are by weight and all temperatures are in degrees centigrade unless otherwise noted.

EXAMPLE 1

Into a one-liter capacity flask equipped with a thermometer, stirrer, and Dean Stark type moisture trap and condenser, there were added 128 grams of the monoethanolamide of cocoanut oil fatty acids, 300 grams of a polyethylene glycol having a molecular weight of 300, 34 grams of paraformaldehyde and 1.5 grams of concentrated sulfuric acid together with 100 milliliters of cyclohexane. After starting agitation, the mixture was heated to reflux temperature and water was removed azeotropically over a period of about 145 minutes. The residual cyclohexane was then removed by distillation. Five grams of sodium bicarbonate were added to neutralize the catalyst and 3 grams of an oxyalkylene polyol sold under the trademark QUADROL ® were added as a stabilizer. The amount of product obtained was 434 grams. The appearance of the product was a clear yellow liquid. The product was further characterized as having a pH (1 percent by weight aqueous solution) of 8.0, a cloud point (1 percent by weight aqueous solution) of greater than 75° C., a surface tension of 26 dynes per centimeter at 0.1 percent by weight concentration in water, and a Draves sink time of 68 seconds at 0.1 percent by weight concentration in water.

EXAMPLE 2

Example 1 is repeated substituting a polyoxyalkylene block copolymer derived from the reaction of ethylene oxide and propylene oxide for the polyethylene glycol of Example 1.

EXAMPLE 3

Example 1 is repeated substituting a heteric polyoxyalkylene glycol for the polyethylene glycol of Example 1.

EXAMPLE 4

Example 1 is repeated sustituting a mixture of the polyethylene glycol of Example 1 and an oxyalkylene block copolymer derived from the reaction of ethylene oxide and propylene oxide for the polyethylene glycol of Example 1.

EXAMPLE 5

Example 1 is repeated sustituting a mixture of the polyethylene glycol of Example 1 and a heteric copolymer derived from the reaction of ethylene oxide and propylene oxide for the polyethylene glycol of Example 1.

EXAMPLE 6

Example 1 is repeated sustituting a heteric-block copolymer of polyethylene glycol and an oxyalkylene block copolymer derived from the reaction of ethylene oxide and propylene oxide for the polyethylene glycol of Example 1.

EXAMPLE 7

Example 1 is repeated substituting 143 grams of N-methyl stearamide for the monoethanolamide of the cocoanut fatty acids used in Example 1.

EXAMPLE 8

Example 1 is repeated substituting 86 grams of the N-2-hydroxypropylamide of oleic acid for the amide of Example 1.

While this invention has been described with reference to certain specific embodiments, it will be recognized by those skilled in the art that many variations are possible without departing from the scope and spirit of the invention.

The embodiments of the invention in which an exclusive privilege or property is claimed are defined as follows:

1. A composition of matter having the formula:

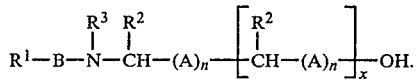

wherein $R^1$ is the residue of a hydrophobic monofunctional aliphatic or aliphatic-aromatic compound selected from the group consisting of at least one of an alkyl, alykylaryl, arylalkyl, and alkylarylalkyl group; wherein each alkyl group has about 6 to about 30 carbon atoms: B is C=O; and wherein $R^2$ is hydrogen or alkyl of 1 to about 4 carbon atoms; $R^3$ is alkyl or substituted alkyl of 1 to about 4 carbon atoms; A is the residue of a hydrophilic oxyalkylene polymer which is derived from different alkylene oxides or different hydrophilic oxyalkylene polymers at least one of said polymers being derived from different alkylene oxides wherein said alkylene oxides have 2 to 4 carbon atoms and said polymers are the reaction product of said alkylene oxides with an active hydrogen compound having at least 2 active hydrogen atoms; x is an integer of 1 to 20; and n is individually selected from integers such that the molecular weight is up to about 1000.

2. A composition of matter having the formula

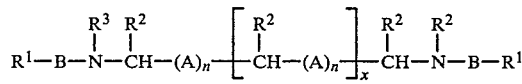

wherein $R^1$ is the residue of a hydrophobic monofunctional aliphatic, or aliphatic-aromatic compound selected from the group consisting of at least one of an alkyl, alkylaryl, arylalkyl, and alkylarylalkyl group; wherein each alkyl group has about 6 to about 30 carbon atoms; B is C=O, and wherein $R^2$ is hydrogen or alkyl of 1 to about 4 carbon atoms, $R^3$ is alkyl or substituted alkyl of 1 to about 4 carbon atoms; A is the residue of a hydrophilic oxyalkylene polymer which is derived from different alkylene oxides or different hydrophilic oxyalkylene polymers at least one of said polymers being derived from different alkylene oxides wherein said alkylene oxides have 2 to 4 carbon atoms and said polymers are the reaction product of said alkylene oxides with an active hydrogen compound having at least 2 active hydrogen atoms; x is an integer of 1 to 20; and n is individually selected from integers such that the molecular weight is up to about 1000.

3. The compositions of claim 1 or 2 wherein $R^2$ is hydrogen.

4. The compositions of claim 3 wherein A is the residue of a hydrophilic polyoxyalkylene glycol derived from ethylene oxide and propylene oxide.

5. The composition of claim 3 wherein A is the residue of a hydrophilic polyoxyalkylene glycol derived from a mixture of ethylene oxide and alkylene oxides having 3 to 4 carbon atoms.

6. The composition of claim 4 wherein x is an integer of 1 to 10.

7. The compositions of claims 1 or 2 wherein $R^2$ is alkyl of 1 to about 4 carbon atoms and A is the residue of a hydrophilic polyoxyalkylene glycol derived from ethylene oxide and propylene oxide.

* * * * *